March 24, 1970     J. HAISMA ET AL     3,503,004
LASER CONSTRUCTION
Filed Oct. 4, 1966
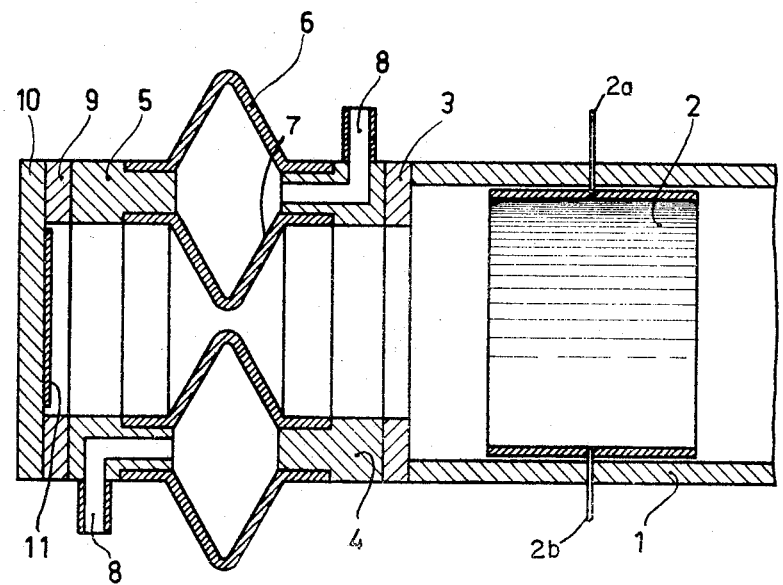
INVENTORS
JAN HAISMA
CORNELIS L. ALTING
BY
AGENT 3,503,004
LASER CONSTRUCTION
Jan Haisma and Cornelis Leendert Alting, Eindhoven, Netherlands, assignors, by mesne assignments, to U.S. Philips Corporation, New York, N.Y., a corporation of Delaware
Filed Oct. 4, 1966, Ser. No. 584,228
Claims priority, application Netherlands, Oct. 8, 1965, 6513043
Int. Cl. H01s 3/02
U.S. Cl. 331—94.5                5 Claims

ABSTRACT OF THE DISCLOSURE

Construction of an infrared region laser having a fluid controllable bellows-like arrangement for varying the cavity length.

---

The invention relates to laser construction and particularly to a detuning arrangement for a laser radiating in the infrared region.

Detuning or frequency shifting between resonant modes in an oscillating laser may be accomplished by axially varying the laser cavity a distance approximating ½ wavelength of the stimulated emission. In the visual, ultraviolet, and near infrared regions, a ½ wavelength displacement is relatively small and, in a gas discharge laser, may conveniently be provided by a perforated cylindrical body of electrostructive material forming part of the cavity wall or inserted between the cavity discharge space and one of the two spaced laser reflectors. Since electrostrictive material may be made to expand by means of an applied voltage, the reflector separation and thus the cavity length may be selectively altered. In the far infrared regions however, where the wavelength of the radiation approaches 50 microns, the electrostrictive member cannot readily produce a variation of ½ wavelength unless an excessively large member is used. Furthermore, the larger movement required results in poor laser frequency stability because of possible reflector misalignment from the use of large amounts of electrostrictive material.

It is therefore a prime object of the invention to provide an arrangement for accurately detuning a laser.

It is a further object of this invention to provide an arrangement for detuning a laser operating in the far infrared region without reliance upon electrostrictive material.

It is still a further object of the invention to provide an arrangement for detuning a laser operating in the far infrared region while maintaining sufficient alignment between the reflectors.

In accordance with the invention, a gas discharge laser is provided with a detuning member in the form of a hollow walled cylindrical member forming a portion of the cavity wall between the reflectors. Within the member wall and at the approximate center thereof, there is formed a continuous cavity having a pair of relatively resilient concentric walls which are respectively widened in to the interior and out to the exterior in bellows-like fashion, thereby enclosing a space. This space is provided with one or more symmetrically arranged ducts for supplying a fluid such as a liquid or a gas under sufficient pressure to vary the length of the member. Because of the bellows-like structure, the length of the member will be varied in accordance with the pressure in the enclosed space while maintaining the reflective end faces of the cavity in sufficient parallelism to ensure accurate alignment and frequency stability.

The foregoing objects and description as well as further objects and advantages of the invention will become apparent with reference to the following description and the drawing, illustrating a laser for operating in the infrared region with a detuning member in accordance with the invention.

Referring to the drawing, reference numeral 1 designates a glass tube of over 4 cms. diameter in which a hollow platinum electrode 2 is secured to a pair of stay wires 2a and 2b. The detuning member is externally provided with two glass rings 3 and 9 ground to flatness between which two steel rings 4 and 5 are arranged. The rings 4 and 5 have diametrically opposed ducts 8 which extend to the toroidal hollow space constituted by the two bellows-like walls 6 and 7. The laser is sealed by a flat glass plate 10 which is provided with a reflective gold layer 11. The parts 4, 5, 6 and 7 are secured to each other by soldering, the parts 6 and 7 consisting of Invar. Glass and metal parts are secured to each other by means of cement. If the rings 4 and 5 have an inner diameter of 30 mms. and an outer diameter of 42 mms. with a thickness 1 mm., a variation in length of approximately 1 mm. could be ascertained after increasing the inner pressure in the cavity to 15 atmospheres. This means that the displacements are sufficient for uses as far as in the submillimeter range. For example, a far infrared 100-micron wavelength emission would have a ½ wavelength corresponding to a length change of only 0.05 mm., well within the range of the present invention. Because of the parallel movement of the wall parts 6 and 7, parallelism between reflectors remains within the limits imposed.

The above cited embodiments are intended as exemplary only, and while we have described our invention with a specific application and embodiment thereof, other modifications will be apparent to those skilled in the art without departing from the spirit and scope of the invention as defined by the appended claims.

What is claimed is:

1. In a device producing stimulated emission within a discharge cavity having first and second reflective end surfaces positioned along an optical path enclosed by a cavity wall, means for varying the distance between said reflective end surfaces, said means comprising first and second relatively resilient members spaced from one another to form a hollow wall portion of said cavity wall, and means for introducing pressure between said members for flexing said resilient members in a direction causing the length of said optical path to vary.

2. The combination of claim 1 wherein said first and second members form a pair of relatively resilient concentric walls which are respectively widened into the interior and out to the exterior of said cavity in bellows-like fashion.

3. The combination of claim 1 wherein said means for introducing pressure includes at least one duct connected to the outer of said hollow wall members for introducing a fluid between said members.

4. In a device producing stimulated emission within a block containing a discharge cavity having first and second reflective end surfaces, means for varying the distance between said reflective end surfaces and comprising first and second members spaced from one another to form a pair of relatively resilient concentric walls which are respectively widened into the interior and out to the exterior of said cavity in bellows-like fashion, said means mounting one of said reflective surfaces to said block, and means for introducing pressure between said members.

5. The combination of claim 4 wherein said means for introducing pressure includes at least one duct connected to the outer of said hollow wall members for introducing a fluid between said members.

References Cited

UNITED STATES PATENTS

| | | | |
|---|---|---|---|
| 3,013,392 | 12/1961 | Falge et al. | 350—289 |
| 3,092,419 | 6/1963 | Erdely | 92—92 |
| 3,252,110 | 5/1966 | Gustafson et al. | 331—94.5 |
| 3,278,858 | 10/1966 | Faust et al. | 331—94.5 |
| 3,363,196 | 1/1968 | Eknayan | 331—94.5 |

JOHN KOMINSKI, Primary Examiner

U.S. Cl. X.R.

92—32, 91, 92; 350—279, 289, 310